United States Patent
Kraemer et al.

[11] 4,034,411
[45] July 5, 1977

[54] MAGNETIC DISK INFORMATION STORAGE APPARATUS

[75] Inventors: Edward Joseph Kraemer; Tulsidas Ramlal Patel, both of San Jose, Calif.

[73] Assignee: International Business Machines Corporation, Armonk, N.Y.

[22] Filed: July 11, 1975

[21] Appl. No.: 595,251

[52] U.S. Cl. .................................. 360/98; 346/137; 360/106; 360/133

[51] Int. Cl.² .................. G11B 5/012; G11B 23/02; G11B 21/08

[58] Field of Search ............... 346/137; 360/98, 78, 360/86, 97, 106, 135, 133

[56] References Cited
UNITED STATES PATENTS

| | | | |
|---|---|---|---|
| 3,470,399 | 9/1969 | Johnson et al. | 360/97 |
| 3,634,836 | 1/1972 | Huetten | 360/102 |
| 3,643,242 | 2/1972 | Bryer | 360/98;103 |
| 3,768,083 | 10/1973 | Pejcha | 360/98 |
| 3,786,454 | 1/1974 | Lissner et al. | 360/98 |
| 3,843,967 | 10/1974 | Mulvany | 360/98 |
| 3,849,800 | 11/1974 | Cuzner et al. | 360/97 |
| 3,886,595 | 5/1975 | Swaim et al. | 360/98 |

*Primary Examiner*—Alfred H. Eddleman
*Attorney, Agent, or Firm*—R. E. Cummins

[57] ABSTRACT

A magnetic disk information storage apparatus comprises a head/disk assembly removably mounted in a housing assembly. The head/disk assembly encloses rotatably mounted disks, and accessing heads mounted for linear movement on a carriage. Fixed to the carriage and therefore part of the subassembly is a linear actuator coil. The linear actuator magnet structure which cooperates with the coil to produce motion of the carriage is located in the housing assembly. Loadings of the subassembly into the housing assembly locates the actuator coil in a magnetic flux gap of the magnet structure.

35 Claims, 5 Drawing Figures

MAGNETIC DISK INFORMATION STORAGE APPARATUS

BACKGROUND OF THE INVENTION

1. Field of the Invention

This invention relates to magnetic disk information storage apparatus utilizing a removable head/disk assembly.

The term "head/disk assembly" or "HDA" is often employed to denote a subassembly which is neither customer removable nor a separate product but which may be removed and reinstalled by a maintenance engineer. As used here, head/disk assembly is intended to apply generically not only to such subassemblies, but also to customer removable and interchangeable "data modules," marketed as separate products, and which include both heads and disks.

2. Description of the Prior Art

The advantages of a modular construction of disk file in which disks and movable heads are enclosed in a sealable module or subassembly are discussed in U.S. Pat. No. 3,786,454, Ser. No. 206,688, filed Dec. 10, 1971 in behalf of R. W. Lissner and R. B. Mulvany and 3,849,800, Ser. No. 231,320, filed Mar. 2, 1972 in behalf of D. E. Cuzner et al, both assigned to the assignee of the present invention. Modular construction provides either interchangeability of stored data between files for a customer as in U.S. Pat. No. 3,786,454 or else, as in U.S. Pat. No. 3,849,800 it provides ease of assembly and disassembly for manufacture or servicing. Permanently associating heads and disks in the same assembly reduces tolerance requirements. Furthermore, the assemblies are easily sealed and the heads and disks can be maintained in a very clean environment to reduce the risk of contaminants interfering with the flying properties of the heads at spacings as low as 50 microinches. Finally, employment of a head/disk assembly allows the possibility of isolating the heads and disks to some extent from vibrations generated elsewhere within the apparatus.

U.S. Pat. No. 3,849,800 specifically discloses a magnetic disk apparatus including a sealed module which encloses a magnetic disk, magnetic heads incorporated in head/arm assemblies, an electromagnetic actuator for positioning the magnetic heads on the head/arm assemblies relative to the disk and a drive spindle on which the disk is seated. The weight of the module includes the weight of the actuator magnet structure which is mounted on the same base casting as the drive spindle and disks. The spindle and disks are thus directly subject to vibrations induced by reaction of the actuator magnet structure during operation of the actuator. For a multi disk file, particularly of the type in which a great number of head/arm assemblies are mounted for linear motion on the carriage, a very much larger and stronger magnet structure would have to be employed. Any attempt to decrease access time would also require a stronger and therefore, generally, heavier magnet structure. This would lead to disadvantages both in terms of increased weight and increased reaction forces.

U.S. Pat. No. 3,786,454 discloses a disk storage apparatus including an interchangeable sealed cartridge, enclosing magnetic disks, accessing magnetic head/arm assemblies, a movable carriage to which the head arms are mounted, and a drive spindle on which the disks are seated. For accessing the heads to selected data tracks, coupling means are provided to engage the carriage and head arm assemblies with a voice coil motor, disposed in a disk file housing for accommodating the cartridge. The file housing includes a drive motor coupled by pulley means, for example, to the enclosed spindle to provide rotary motion to the disks.

The coupling means is a relatively complex mechanism. Attached to the coil of the voice coil motor is a spring loaded coupling pin and operating shaft. A support and actuator mechanism is also provided in the file housing for supporting the coil when not coupled to the carriage and for actuating the operating shaft to effect coupling.

Although it was well known in earlier disk files both of the fixed and removable disk type to employ a linear voice coil actuator in which the actuator coil was permanently coupled to the carriage, such files did not have the many advantages of a modular head/disk assembly enumerated above. One such typical system is shown in U.S. Pat. No. 3,470,399, Ser. No. 737,438, filed June 17, 1968 in behalf of J. J. Johnson and H. C. Stephens and assigned to the same assignee as the present invention.

SUMMARY OF THE INVENTION

An object of the invention is to provide a novel and improved magnetic disk information storage apparatus.

Another object is to provide a novel and improved removable head/disk assembly for mounting in a housing assembly of such apparatus.

A further object is to provide a novel and improved housing assembly for receiving such a head/disk assembly to constitute a magnetic disk information storage apparatus.

Another object is to provide a magnetic disk information storage apparatus of modular construction for ease of assembly, disassembly or interchangeability.

A further object is to minimize the number of components in a removable head/disk assembly to reduce the weight and size thereof.

Still another object is to provide a simple and efficient method of coupling a removable head/disk assembly to a housing assembly to permit cooperation of certain elements of each assembly.

Accordingly, the present invention provides a magnetic disk information storage apparatus comprising a housing assembly for receiving a removable head/disk assembly therein. The housing assembly includes a magnet structure defining an open ended magnet flux gap for a linear actuator of the voice coil type. The head/disk assembly includes, within an enclosure, disks mounted on a spindle for rotation therewith and accessing heads in transducing relation with the disks. The heads are mounted for linear movement on a carriage to which is permanently secured, as part of the head/disk assembly, a linear actuator coil.

The need for a complex mechanical coupling between carriage and coil is removed by the realization that the coil is already physically out of contact with the actuator magnet structure. Thus, the linear actuator becomes a convenient place to separate the head/disk assembly from the housing assembly. In this way the heavy, unwieldy and vibration inducing magnet structure is isolated in the housing assembly. Furthermore, by coupling the coil permanently to the carriage, the carriage structure is better balanced and also the carriage can be made of one piece and can be shorter, lighter and more rigid than where a coupling mechanism is employed. This one piece construction is a preferred feature of the invention.

A further preferred feature of the invention is the inclusion of a flux shield in the head/disk assembly to shield the disks thereof from flux in the magnet structure gap.

BRIEF DESCRIPTION OF THE DRAWING

The invention will be described in greater detail with reference to the drawing, in which.

DESCRIPTION OF THE PREFERRED EMBODIMENT

Figure 1:
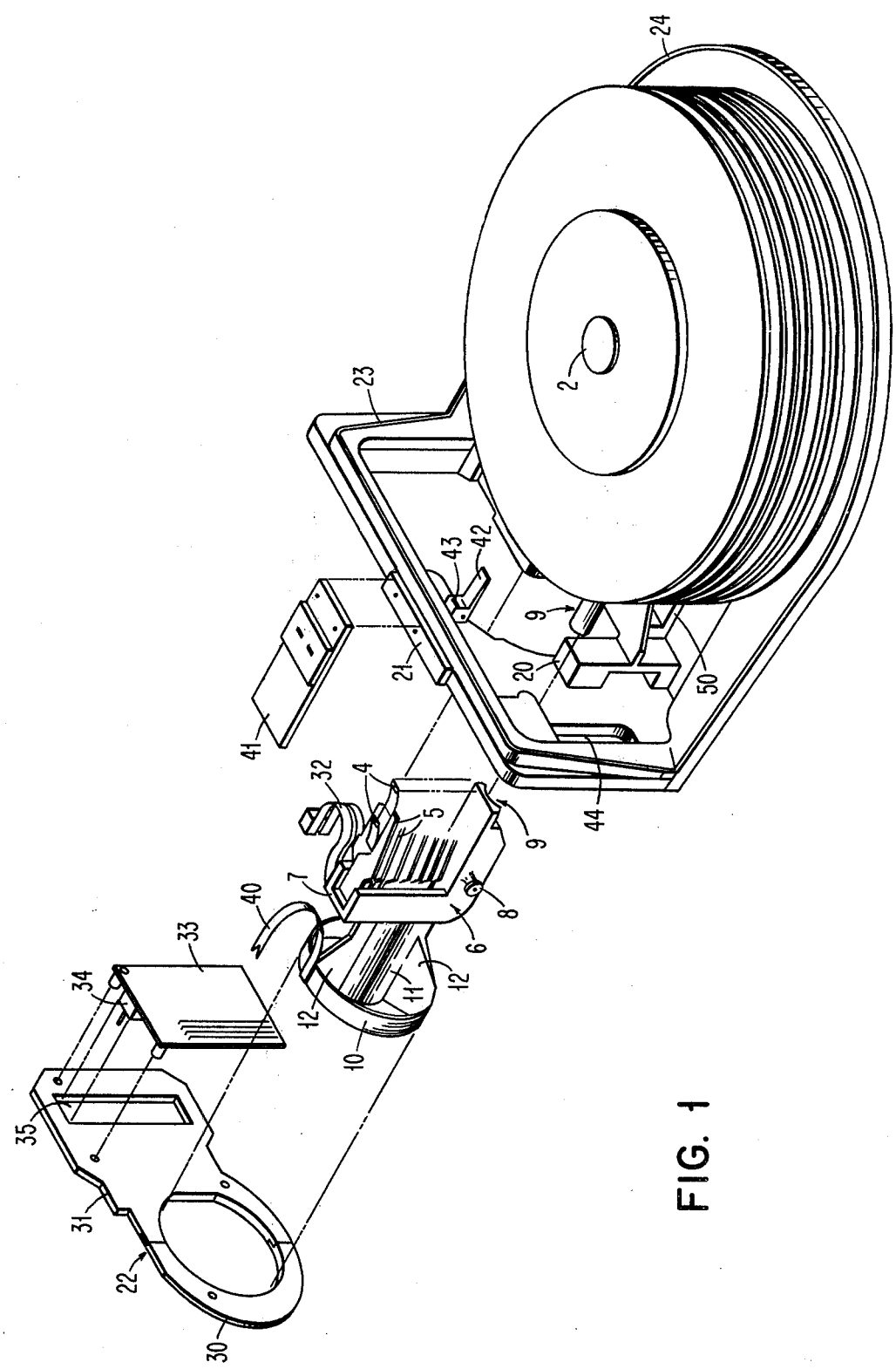
FIG. 1 is an exploded isometric view of essential components of a head/disk assembly, according to the present invention.
Figures 3, 3A:
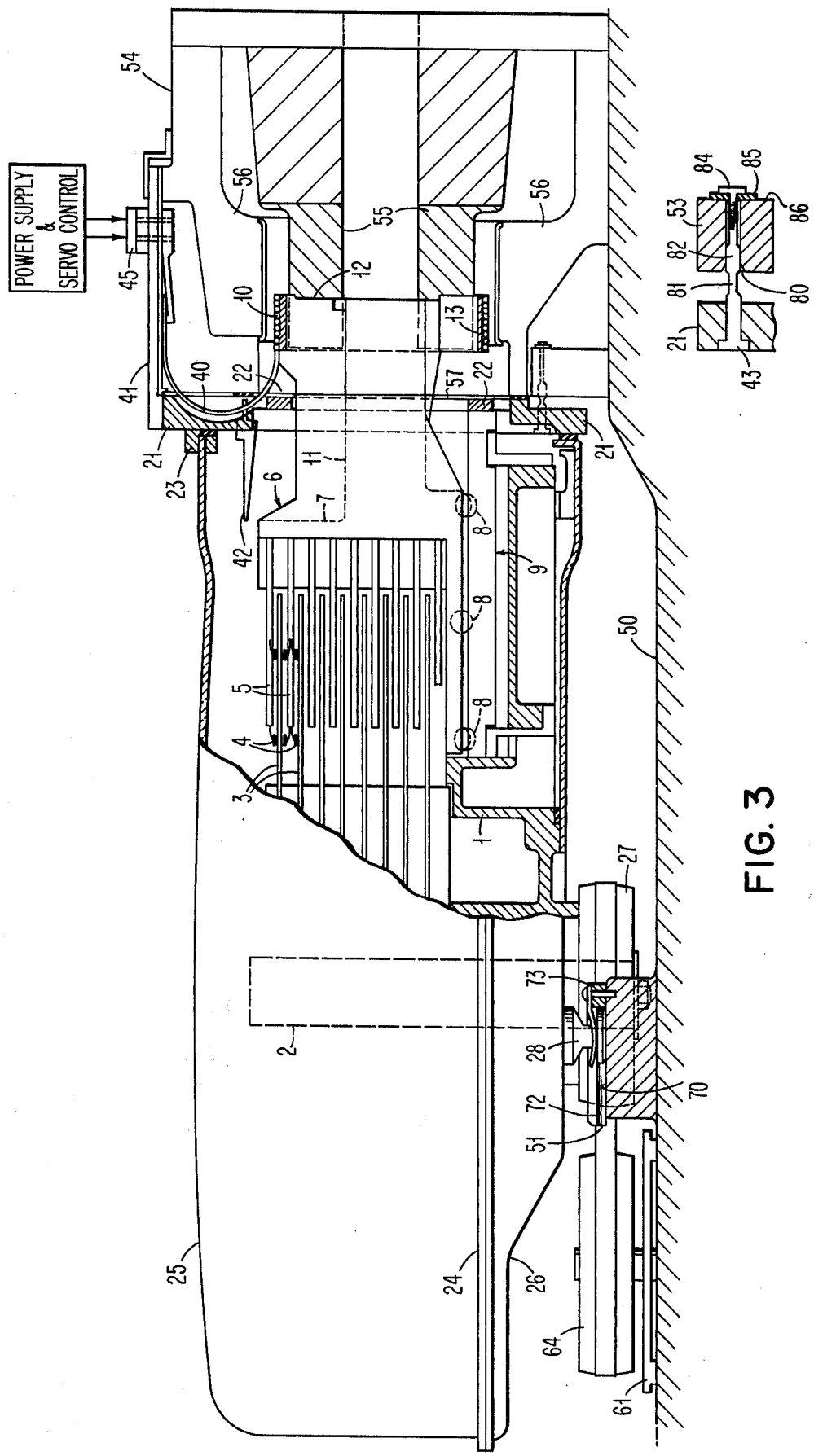
FIG. 3, consisting of FIGS. 3 and 3A, is a side elevation, partly broken away and partly in section, of a magnetic disk information storage apparatus, according to the present invention which incorporates the head/disk assembly of FIG. 1 and the housing assembly of FIG. 2.

With reference to FIGS. 1 and 3, a head/disk assembly according to the invention, comprises a base casting 1 in which is mounted for rotation a spindle 2. Mounted on the spindle by well known means for rotation therewith are several spaced apart magnetic information storage disks 3. A plurality of movable magnetic heads 4 are mounted in head/arm assemblies 5 in transducing relation with the magnetic disks 3 for the transfer of information therebetween. In this particular embodiment, there are two such heads for each disk surface and four on all but the extreme head/arm assemblies. The magnetic heads are not illustrated in detail, but are formed, by way of example, from air bearing ferrite sliders having transducing gaps and electrical windings substantially as described in U.S. Pat. No. 3,823,416. The heads are designed to start and stop in contact with the disk surfaces and are biased towards the disk surfaces by flexures in the head/arm assemblies 5.

The head/arm assemblies are themselves supported in cantilever fashion from an upright head support portion 7 of a carriage 6. The carriage includes wheel bearings 8 supporting it for movement along a way system 9. The way system 9 consists of a central guide rod and of spring and fixed side plates on which the bearing wheels ride. The way system and the carriage bearing arrangement are substantially the same as described in U.S. Pat. No. 3,838,455. The way system 9 constrains the carriage to movement along a linear path radially of the spindle 2 and disks 3. Movement of the carriage along its linear path carries the heads 4 to selected data tracks on the disks 3 for reading or writing data thereon.

All but one of the surfaces of disks 3 are used for data storage. Heads 4 operate on these surfaces to read and write data on selected tracks thereon. These data heads are positioned on the desired tracks by movement of the carriage 6 under control of a head positioning servo system. One of the disk surfaces has permanent position reference servo information recorded thereon and this is read by dedicated servo heads to provide an input to the servo system. Since the servo heads and data heads, comprising heads 4, are ganged for movement together on the carriage 6, positioning of a servo head at a desired location on the servo disk surface also positions one or more of the data heads at a corresponding position on a data disk surface. Such servo systems generally comprise a track accessing system for moving the head between tracks and a track following system for maintaining a head on a desired track. Such systems are well known in the art and will not be described further. One such system is described in an article by R. K. Oswald in the IBM Journal of Research and Development Vol. 18, No. 6, pp 506–512 (November 1974) and entitled "Design of a Disk File Head-Positioning Servo."

Returning to FIGS. 1 and 3, the carriage 6 also includes a horizontally extending portion for supporting a hollow coil 10. The coil support portion includes a central barrel section 11 from which extend three fins 12 angularly spaced 120° apart about the barrel section. The coil 10 is wound on an aluminum former 13 which is secured to the tips of the fins 12. The former is split and coated with an insulating material to minimize eddy currents. The coil 10 constitutes the prime mover of a linear actuator for the carriage 6 to be described in greater detail below. The body of the carriage 6 including the head and coil support portions is of one piece magnesium construction for lightness and rigidity.

The base casting 1 of the head/disk assembly terminates at the end remote from the disks 3 in two blocks, one of which 20 is visible in FIG. 1. Secured to these blocks is an apertured faceplate 21. In one aperture of the faceplate is inserted a magnetic flux shield 22.

Secured to the rear periphery of the faceplate 21 is an approximately rectangular frame member 23. Extending orthogonally from the base of the faceplate 21 and encircling the base casting 1 and disks 3 is a hoop-like frame member 24. An upper cover 25, which may be made of a plastics material, is secured to the frame members 23 and 24 to cover the disks 3. A lower cover 26, also made of a plastics material, is secured to the underside of the hoop frame member 24. The lower cover 26 has a circular aperture therein which is sealed to an exposed portion of the underside of base casting 1. From the exposed portion of the base casting protrude the spindle 2, terminating in a pulley 27, and also two support feet 28 and 29 screwed into the base casting 1, only one foot, 28, being visible in FIG. 3. As shown in FIG. 3, the disks 3, heads 4 and the head support position of carriage 6 are enclosed by covers 25 and 26 and by base casting 1. The enclosure so formed is pneumatically sealed except for an interface region at the faceplate 21.

At this interface, the carriage 6 passes through an aperture in the flux shield 22 to support the coil 10 on the exterior of the head/disk assembly. The flux shield 22 consists of two portions 30 and 31 which together define a near annular portion through the central aperture of which the carriage passes. The median diameter of the annual portion is substantially the same as that of the coil so that the flux shield masks the interior of the subassembly from the coil. When the flux shield portions 30 and 31 are bolted in place in the faceplate 21 the carriage assembly cannot pass through the aperture of the flux shield. It can, however, move sufficiently for the heads 4 to access all the tracks on disks 3.

The heads 4 are electrically connected to a terminal post (not shown) by flexible cables 32. This post is electrically connected in turn to a printed circuit board 33 which is screwed to the rear of flux shield portion 31. A pin connector assembly 34 on the outermost face of the printed circuit board extends through an aperture 35 in flux shield portion 31 and is sealed therein. Signals from the heads 4 are connected by way of connector assembly 34 to further processing and utilization circuitry located in the housing assembly.

Electrical connection to the coil 10 is provided by a flexible cable 40. This extends towards the head/disk assembly from the topmost point of the coil and is bent through 180° to attach to a terminal flexure plate 41. The terminal plate is cantilevered out from the upper edge of the faceplate 21. Coil current from a head positioning servo system, as indicated above, is supplied to the terminal 41 via a cable and connector 45.

Beneath the same upper portion of the faceplate is located a pivoted latch 42 which is constantly urged downwardly by a coil spring. The latch 42 serves to hold the carriage 6 in its innermost position when latch 42 drops behind the upright portion 7 of the carriage 6. The latch is raised to release the carriage by operation of a movable pin (not shown) protruding from the front of faceplate 21 in the region of the latch.

One further feature of the head/disk assembly interface is the air inlet port 44 in the faceplate 21. Pressurized and filtered air enters the subassembly here through an external hose connection (not shown). After circulation within the subassembly, the air passes out through the aperture of flux shield 22 and between the fins 12 of carriage 6.

As shown in FIG. 3, a coupling pin 43 is press fitted in the faceplate 21 and protrudes therefrom. The coupling pin 43 constitutes the only means by which the subassembly is registered at the interface with the housing assembly. The pin 43 and the feet 28 and 29 provide all the surfaces by which the head/disk assembly may be registered in the housing assembly in a manner to be described below.

Figure 2:
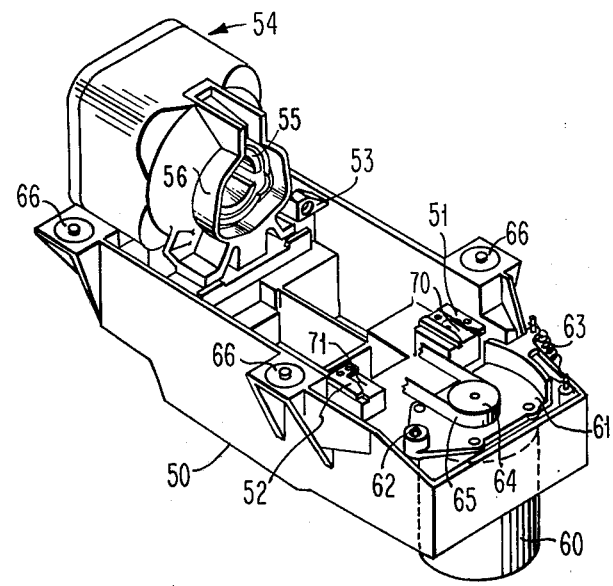
FIGS. 2 and 2A are isometric views of a housing assembly, according to the present invention.
Figure 2A:
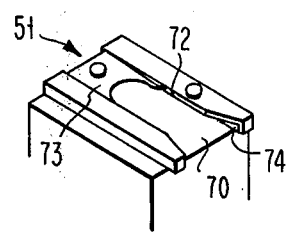

In FIG. 2 is illustrated the housing assembly in which the head/disk assembly of FIG. 1 is mounted to form a disk information storage apparatus as shown in FIG. 3.

The housing assembly comprises a casting 50 on which are secured locating shoes 51 and 52 for the feet 28 and 29 of the head/disk assembly. A coupling bracket 53 for receiving the coupling pin 43 is pinned and bolted to the housing assembly casting. Next to the bracket 53 is bolted an encased linear motor magnet structure 54, which contains a center pole piece 55 concentric with an outer annular pole piece 56. The space between the inner and outer pole pieces defines an open ended magnetic flux gap in which the coil 10 is received. The center pole piece 55 is longitudinally split into three spaced apart portions, to accommodate the fins 12 of the coil support portion of carriage 6. A foam rubber seal 57 surrounds the flux gap on the outer face of the motor casing. This seal contacts the flux shield 22 around the aperture thereof.

Also mounted in a well in the casting 50 is a motor 60 for driving the disks of the head/disk assembly. The motor is suspended from a plate 61 pivotally mounted about pivot pin 62. The plate is urged to pivot away from the magnet structure 54 by a spring 63. A motor pulley 64 is coupled to the spindle pulley 27 by a belt 65 which is tensioned by spring 63.

The entire casting 50 is itself supported on shock mounts 66 in a boxed-in frame structure, not shown. Within the frame structure is a pump (not shown) for circulating the filtered air within the head/disk assembly. Also within the frame structure is head signal processing circuitry additional to that within the head/disk assembly and also head position servo circuitry for positioning heads 4 by controlling current supplied to the coil 10 via connector 45.

The means by which the head/disk assembly may be mounted and located in the housing assembly will now be described in more detail with reference to FIGS. 2 and 3. The head/disk assembly is manually loaded in the housing assembly by first locating the feet 28 and 29 on raised registration surfaces 70 and 71 on the casting 50 for entry in the respectively U and L shaped locating shoes 51 and 52. When loaded, there is a small clearance between the shoes and the feet. Simultaneously, the coupling pin 43 is positioned for entry into a bore 80 in bracket 53. The head/disk assembly is slid towards the magnet structure 54 on a surfaces 70 and 71 and the feet 28 move into shoes 51 and 52 and are retained therein by upper lips 72. The foot 28 is additionally retained in shoe 51 by a bifurcated leaf spring 73.

The coupling pin 43 includes a first stepped down section 81, a shoulder section 82 and a terminal reduced section 83 of very slightly smaller diameter than the shoulder 82. In the end of the terminal section 83 is a threaded bore. The shoulder section 82 of pin 43 engages the inner surface of bore 80 to fix the orientation of the head/disk assembly to the housing assembly. The longitudinal position of the pin 43 in the bracket 53 is determined precisely by the action of a screw 84 and washer 85. The screw and washer bear against the rear surface 86 of the bracket 53 to retain the pin therein against the tension of motor plate spring 63 applied through the pulley belt 65 to the head/disk assembly. Simultaneously with the entry of pin 43 into bore 80 of bracket 53, coil 10 enters the magnetic flux gap between the center and outer pole pieces 55 and 56 of magnet structure 54. Since the pin 43 engages bore 80 in coupling bracket 53 just prior to entry of coil 10 into the flux gap, the coil is sufficiently precisely positioned to enter the flux gap without contacting the pole pieces. Correct orientation of the head/disk assembly about the pin axis is assured by the location of feet 28 and 29 on surfaces 70 and 71.

The tensile force applied to the head/disk assembly through the pulley belt not only registers the head/disk assembly longitudinally with respect to the bracket 53 but also provides a moment tending to pivot the head/disk assembly about pin 43 and register one side of foot 29 against an inner registration surface 74 of the locating shoe 51.

The position of the head/disc assembly in the housing assembly is thus completely defined by registration surfaces 70, 71, 74 and 86. One position plane is defined by the foot registration surfaces 70 and 71 and the head/disk assembly is registered in this plane by its own weight and by the spring 73. Two vertical position planes are defined by surfaces 74 and 86 and the head/disk assembly is registered in these planes only by the force exerted on the pulley 27 through belt 65. The above described locating and mounting system may also facilitate isolation of the head/disk assembly from vibrations emanating from the housing assembly.

The described in connection with FIGS. 1-3 is not normally intended to be removed from the housing assembly. One subassembly is intended to remain associated with the same housing assembly during the working life of the machine. However, head/disk asssemblies may need to be removed and interchanged for repair or data recovery purposes. For removal from the machine, a cover (not shown) may be provided for the head/disk assembly interface to protect the coil and to prevent entry of contaminating material.

However, although such a head/disk assembly has been described, the invention also comprises the possibility of a customer interchangeable module.

Also, although a one piece carriage body has been described and is preferred, apparatus within the invention could comprise a multi-part carriage body rigidly secured together.

Other modifications and variations will be clear to one skilled in the art.

What is claimed is:

1. A housing assembly comprising part of a magnetic disk information storage apparatus and adapted to receive therein a removable head/disk subassembly comprising a rigid support structure, spindle means rotatably mounted in said support structure, magnetic disk means mounted on said spindle means for concentric rotation therewith, magnetic head means in transducing relation with said disk means, carriage means supporting said head means and being mounted on said support structure for movement alone a linear path whereby to carry said head means to different positions relative to said means, hollow rigid electrically conductive coil means supported on said carriage means, and means for electrically connecting said coil means to said housing assembly;

said housing assembly comprising registration and guide means adapted to guide such a head/disk assembly parallel to the carriage means linear path during mounting of the head/disk assembly in said housing assembly and to define an operative position of the subassembly therein, means for supplying electric current to such a head/disk assembly by way of the connecting means thereof, drive means for providing rotary drive to the spindle means of such a head/disk assembly when mounted in its operative position in said housing assembly, and a magnetizable structure including a pair of magnetic pole means defining an open ended magnetic flux gap, extending parallel to said registration and guide means and adapted to receive the coil means therein when such a head/disk assembly is guided into its operative position in said housing assembly, so as to constitute a linear electromagnetic actuator for moving said carriage along its linear path in response to current from said supply means.

2. Magnetic disk information storage apparatus comprising a housing assembly having a first portion of an electromagnetic actuator and a removable head/disk assembly having a second cooperating portion of said actuator;

said housing assembly comprising a magnetizable structure constituting said first portion of said electromagnetic actuator which structure includes a pair of magnetic pole means defining an open ended magnetic flux gap between them; and support means for supporting said head/disk assembly including first registration means;

said head/disk assembly comprising a rigid support structure including second registration means adapted to cooperate with said first registration means to define the operative position of said head/disk assembly in said housing assembly;

spindle means rotatably mounted in said support structure; magnetic disk means mounted on said spindle means for concentric rotation therewith;

magnetic head means in transducing relation with said disk means;

unitary carriage means supporting said head means and being mounted on said support structure for movement along a predetermined path to carry said head means to different positions relative to said disk means;

hollow rigid electrically conductive coil means, constituting said second cooperating portion of said actuator, said coil means being permanently mounted on said carriage means and being located in said magnetic flux gap when said head/disk assembly is in said operative position in said housing assembly;

cover means substantially enclosing said magnetic disk means and said magnetic head means but being adapted to expose an interface portion of said head/disk assembly including said coil means; and means for electrically connecting said coil means to an electrical supply means, said coil means and said magnetizable structure together constituting said electromagnetic actuator and being operable in response to applied electrical current to move said carriage means along its predetermined path.

3. Apparatus according to claim 2 wherein the housing assembly has a complementary interface juxtaposed with said head/disk assembly interface, the apparatus including sealing means for providing a pneumatic seal between said two interfaces.

4. Apparatus according to claim 3 wherein said housing assembly interface further comprises filtered air supply means and said head/disk assembly interface further comprises an air inlet port for receiving air under pressure from said air supply means for circulation within the head/disk assembly, and wherein said actuator provides an air outlet.

5. Apparatus according to claim 2 wherein said carriage means are mounted for movement along a predetermined linear path.

6. Apparatus according to claim 5 wherein said carriage means comprise a support body of one piece construction for supporting said magnetic head means and said electrically conductive coil means.

7. Apparatus according to claim 5 wherein said means for electrically connecting said coil means comprises flexible electrical cable means joined at one end to said coil means, and electrical terminal means fixed to said support structure, to which the other end of said cable means is joined, said cable means extending towards said head/disk assembly from said coil means and being bent through substantially 180° in a plane parallel to the linear path of said carriage means.

8. Apparatus according to claim 7 wherein said electrical terminal means include a plate cantilevered from said support structure to lie above said coil means.

9. Apparatus according to claim 5 wherein said head/disk assembly includes a magnetic flux shield for attenuating magnetic flux from said magnetizable structure flux gap to said magnetic disk means.

10. Appartus according to claim 9 wherein said pair of magnetic pole means comprise center pole means and outer pole means surrounding said center pole means and being spaced apart therefrom to define an open ended gap constituting said flux gap, said coil means being located within said flux gap.

11. Apparatus according to claim 10 wherein said carriage means include a rigid cantilever portion concentric with said hollow coil means, said coil means being supported internally by rigid fin means extending from said carriage cantilever portion, said center pole means of said magnet structure being longitudinally split to permit passage of said fin means.

12. Apparatus according to claim 10 wherein said carriage means include respective support portions for said coil means and said head means at opposite ends thereof and wherein said flux shield comprises an apertured plate means of magnetizable material encircling a portion of said carriage means intermediate said coil and head support portions, said plate means masking said disk means from said coil means and flux gap whereby to attenuate said magnetic flux.

13. Apparatus according to claim 12 wherein said coil and head support portions of said carriage means are too large to pass through the aperture of said plate means,
said plate means being formed of a plurality of overlapping plate sections which together define the aperture.

14. Magnetic disk information storage apparatus comprising a housing assembly having a first portion of an electromagnetic actuator and a removable head/disk assembly having a second cooperating portion of said actuator;
said housing assembly comprising a magnetizable structure constituting said first portion of said electromagnetic actuator which structure includes a pair of magnetic pole means defining an open ended magnetic flux gap between them; and
support means for supporting said head/disk assembly including first registration and guide means;
said head/disk assembly comprising a rigid support structure including second registration and guide means adapted to cooperate with said first registration and guide means to define a linear guide path for removal and insertion of said head/disk assembly from or into said housing assembly and for defining an operative position of said subassembly therein;
spindle means rotatably mounted in said support structure; magnetic disk means mounted on said spindle means for concentric rotation therewith;
magnetic head means in transducing relation with said disk means;
unitary carriage means supporting said head means and being mounted on said support structure for movement along a predetermined linear path parallel to said guide path to carry said head means to different positions relative to said disk means;
hollow rigid electrically conductive coil means, constituting said second cooperating portion of said actuator, said coil means being permanently mounted on said carriage with its axis parallel to said linear guide path and being located in said magnetic flux gap when said head/disk assembly is in said operative position in said housing assembly; and means for electrically connecting said coil means to an electrical supply means, said coil means and said magnetizable structure together constituting said electromagnetic actuator operable in response to applied electrical current to move said carriage means along its predetermined linear path.

15. Apparatus according to claim 14 further comprising means for selectively retaining said head/disk assembly in said housing assembly.

16. Apparatus according to claim 14 wherein said second registration and guide means include bearing means connected to said rigid support structure, and said first registration and guide means include guideways which cooperate with said bearing means so that said head/disk assembly is slidably located in its operative position in said housing assembly.

17. Apparatus according to claim 16 in which one of said registration and guide means further includes protruding pin means for location in complementary recess means of the other of said registration and guide means, said protruding pin means and recess means together with said bearing means and guideways serving to orient said head/disk assembly to provide noninterfering entry of said coil means into said flux gap of said magnetizable structure during insertion of said head/disk assembly into said housing assembly.

18. Apparatus according to claim 17 wherein said head/disk assembly further includes latch means mounted on said rigid support structure for latching said carriage means in a retracted position, and a latch release means for releasing said latch means upon engagement with said housing assembly during location of said head/disk assembly in said housing assembly.

19. Apparatus according to claim 17 in which said pin means comprises a single notched pin located to one side of a plane including the axes of said spindle means and coil means.

20. Apparatus according to claim 19 in which said rigid support structure includes a base casting through which said spindle means passes to terminate in a pulley, the apparatus including a belt for coupling said pulley to a drive motor whereby to rotate said disk means, said pulley belt tension being applied to said pulley in such a direction as to tend to pivot said head/disk assembly about said notched pin thereby to register said bearing means with said guideways.

21. Apparatus acording to claim 19 in which said notched pin is part of said head/disk assembly, said housing assembly registration and guide means comprising a bracket having a bore therein which constitutes said complementary recess means.

22. An information storage head/disk assembly adapted for selective removal from and location in a housing assembly comprising registration means for defining an operative position of said head/disk assembly therein, and a magnetizable structure including a pair of magnetic pole means defining an open ended magnetic flux gap therebetween;
said head/disk assembly being cooperable with such a housing assembly to form a magnetic disk information storage apparatus and comprising a rigid support structure including registration means adapted to cooperate with the housing assembly registration means to define the operative position of said head/disk assembly therein;
spindle means rotatably mounted in said support structure; magnetic disk means mounted on said spindle means for concentric rotation therewith;
magnetic head means in transducing relation with said disk means;
unitary carriage means supporting said head means and being mounted on said support structure for movement along a predetermined path whereby to carry said head means to different positions relative to said disk means;

hollow rigid electrically conductive coil means premanently mounted on said carriage means;

means for electrically connecting said coil means to an electrical supply means; and cover means substantially enclosing said magnetic disk means and said magnetic head means but being adapted to expose an interface portion of said head/disk assembly including said coil means, said coil means being adapted to intercept magnetic flux within the magnetizable structure flux gap of such a housing assembly when said head/disk assembly is located in its operative position therein so that said coil means and said magnetizable structure constitute an electromagnetic actuator for moving said carriage along its predetermined path in response to electric current applied by way of said electrical connection means.

23. A head/disk assembly according to claim 22 in which said rigid support structure includes a base casting through which said spindle means passes to terminate in a pulley.

24. A head/disk assembly according to claim 22 wherein said carriage means are mounted for movement along a predetermined linear path.

25. A head/disk assembly according to claim 24 wherein said carriage means comprise a support body of one piece construction for supporting said magnetic head means and said electrically conductive coil means.

26. A head/disk assembly according to claim 24 wherein said means for electrically connecting said coil means comprises flexible electrical cable means joined at one end to said coil means and electrical terminal means, fixed to said support structure, to which the other end of said cable means is joined, said cable means extending towards said head/disk assembly from said coil means and being bent through substantially 180° in a plane parallel to the linear path of said carriage means.

27. A head/disk assembly according to claim 26 wherein said electrical terminal means include a plate cantilevered from said support structure.

28. A head/disk assembly according to claim 24 including a magnetic flux shield for attenuating magnetic flux to said magnetic disk means from the magnetizable structure flux gap of such a housing assembly when said heak/disk assembly is mounted therein.

29. A head/disk assembly according to claim 28 for cooperation with a housing assembly wherein the pair of magnetic pole means comprise center pole means and outer pole means surrounding said center pole means and being spaced apart therefrom to define an open ended gap constituting the flux gap;

wherein said head/disk assembly carriage means further includes respective support portions for said coil means and said head means at opposite ends thereof and wherein said flux shield comprises an apertured plate means of magnetizable material encircling a portion of said carriage means intermediate said coil and head support portions, said plate means being adapted to mask said disk means from said coil means and from the flux gap of such a housing assembly.

30. A head/disk assembly according to claim 29 wherein said coil and head support portions of said carriage means are too large to pass through said aperture of said plate means, said plate means being formed of a plurality of overlapping plate sections which together define the aperture.

31. A head/disk assembly according to claim 29 for mounting in a housing assembly wherein the magnetizable structure center pole means is split longitudinally, and wherein said head/disk assembly carriage means include a rigid cantilever portion concentric with said hollow coil means, said coil means being supported internally by rigid fin means extending from said carriage cantilever portion, said fin means being adapted to pass between the split portions of the center pole means of such a housing assembly when said head/disk assembly is located therein.

32. A head/disk assembly according to claim 29 for cooperation with a housing assembly the registration means whereof include guideways;

said head/disk assembly registration means including bearing means connected to said rigid support structure and adapted to slidably locate said head/disk assembly in its operative position in said housing assembly in cooperation with the guideways thereof.

33. A head/disk assembly according to claim 32 in which said head/disk assembly registration means includes protruding pin means adapted for location in a complementary recess means of such a housing assembly registration means, said pin and bearing means being adapted to orient said head/disk assembly to provide non-interfering entry of said coil means into the magnetic flux gap of such a housing assembly, in cooperation with the guideways and recess means thereof, during said slidable location of said head/disk assembly in its operative position therein.

34. A head/disk assembly according to claim 33 further including latch means mounted on said rigid support structure for latching said carriage means in a retracted position, and a latch release means for releasing said latch means upon engagement with such a housing assembly during location of said head/disk assembly therein.

35. A head/disk assembly according to claim 33 in which said pin means comprises a single notched pin located to one side of a plane including the axes of said spindle means and coil means.

* * * * *